UNITED STATES PATENT OFFICE

ANGELO KNORR, OF BERLIN-TEMPELHOF, ALBERT WEISSENBORN, OF POTSDAM, AND EMIL LAAGE, OF UERDINGEN, GERMANY, ASSIGNORS TO WINTHROP CHEMICAL COMPANY, INC., OF NEW YORK, N. Y., A CORPORATION OF NEW YORK

PROCESS OF MANUFACTURING ALDEHYDES AND THE PRODUCTS

No Drawing. Application filed March 6, 1931, Serial No. 520,712, and in Germany March 10, 1930.

Our present invention relates to improvements in the manufacture of substituted aldehydes and to new products obtainable by this process.

It is well known to condense benzaldehyde or ketones with halogeno acetic acid esters by means of an alkaline condensing agent and in the presence of ethyl ether or of an alcohol. The yields obtained, however, according to this known process, are very poor; probably the metallic sodium used as a condensing agent is covered by solid sodium chloride during the reaction, so that it is withdrawn from further action. Thus, (compare, for instance, Comptes rendus, vol. 139, page 1215, and vol. 142, page 214) this reaction between aldehydes and halogeno acetic acid esters was held to be not generally practicable and, in fact, this reaction has not been carried out on a technical scale.

Now, we have found that substituted aldehydes generally can be prepared with satisfactory yields by the following sequence of reactions:

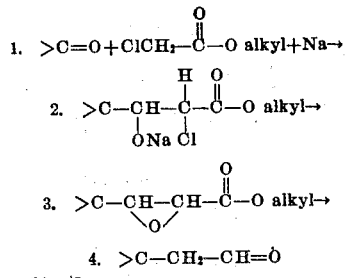

The radical

of the first formula is intended to include as well aromatic aldehydes as aliphatic and aliphatic-aromatic ketones and cyclic ketones. Now, contrary to the known process, the reaction indicated in the first formula, is carried out according to our invention in a medium in which the separation of sodium halogenide in solid form upon the condensing agent does not occur. As such a medium we enumerate, for instance, ligroin, petroleum spirit, cyclohexane, tetrahydronaphthalene, decahydronaphthalene, benzene, toluene, xylene, chlorobenzene. The surprising effect of these liquids contrary to ether, perhaps is explainable by the fact that the intermediate product indicated (sub 2.) of the formulæ given above, is stable and remains dissolved or that the sodium chloride split off is dispersed in this medium in a colloid form or in a fine suspension.

As a condensing agent we may use either metallic sodium or sodium amide or sodium ethylate. These condensing agents may be activated before starting the reaction by addition of a small quantity of anhydrous alcohol.

Preferably the mixture containing the aldehyde or ketone and the halogeno acetic acid ester either in molecular proportions or with an excess of one component, is slowly added to the condensing agent covered by one of the indifferent mediums mentioned above. When using, for instance, metallic sodium, surprisingly no sodium chloride separates and the reaction can be carried to an end with complete consumption of the sodium.

The glycinic acid esters indicated (sub 3.) of the formulæ given above, can be transformed with good yields into the corresponding aldehydes by saponification and by subjecting the acidified solution of the glycinic acid salts to a distillation with steam.

Our invention is illustrated by the following examples:

*Example 1.*—To 25 parts of finely subdivided metallic sodium covered by 375 parts of dry xylene, 1 part of absolute alcohol is added, while stirring, and while cooling intensively. Then in the course of 2 hours a mixture containing 112.5 parts of benzaldehyde and 122.5 parts of chloroacetic acid ethyl ester are introduced at a temperature of 8° C. The metallic sodium is completely consumed. The reaction mass is washed with water and the xylene is removed by distillation. By distillation in a vacuum 150 parts of phenyl glycinic acid ethyl ester are obtainable forming a colorless liquid smelling similar to apples and boiling under a pressure of 4 to 5 mm. mercury at 128 to 130° C.; about 37 parts of the glycinic ester resinify during this distillation.

In order to avoid this loss, preferably the glycinic acid ester is transformed into phenyl acetaldehyde without distilling the intermediate product. The raw ester is saponified by addition of sodium hydroxide solution, while introducing steam in the mixture; then an organic acid as, for instance, oxalic acid, and sulfuric acid are added. Carbondioxide is split off from the free glycinic acid thus obtained and while continuing the introduction of steam, the phenyl acetaldehyde formed, distills over together with the water. In this manner, 62 to 75 parts of phenyl acetaldehyde are obtainable boiling under a pressure of 10 mm. mercury at 80 to 82° C.

*Example 2.*—Under the conditions indicated in Example 1, 125 parts of chloroacetic acid ethyl ether and 142.5 parts of 4-methoxybenzaldehyde are added drop by drop to 25 parts of metallic sodium covered by 375 parts of xylene. In working up the condensation product in the manner described, 145 parts of the corresponding glycinic acid ester are obtainable.

*Example 3.*—A mixture of 490 parts of chloroacetic acid ethyl ester and 600 parts of 4-chlorobenzaldehyde is added drop by drop in the course of 2 hours at a temperature of 8° C. to 100 parts of pulverized metallic sodium covered by 1500 parts of xylene. When distilling in a vacuum the residue remaining after the removal of the xylene, about 600 parts of chlorophenyl glycinic acid ethyl ester are obtainable forming in the pure state a colorless liquid having a smell similar to apples. By saponification of this purified or of the raw glycinic acid ester freed from the excess of chlorobenzaldehyde, 250 to 300 parts of 4-chlorophenylacetaldehyde are obtainable forming in the purified state a colorless compound, melting at 39 to 40° C., smelling similar to phenylacetaldehyde.

*Example 4.*—40 parts of finely pulverized sodium amide are added in the course of 2 hours at about 15 to 20° C., while stirring, to 100 parts of acetophenone and 102 parts of chloroacetic acid ethyl ester dissolved in 200 parts of benzene or xylene. Under evolution of ammonia, the liquid becomes yellowish-red without separation of solid substances. Stirring is continued for 2 hours, then ice is added to the liquid, the reaction product is washed with water and distilled in a vacuum. 110 parts (that is 64% of the theoretical amount) of β-phenyl-β-methyl glycinic acid ethyl ester of the formula

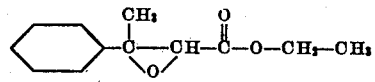

are obtained, forming a colorless liquid which boils at a pressure of 5 mm. mercury at 132 to 134° C. It smells like strawberries. By cleaving the glycinic acid, 1-aldo-2-phenyl-2-methylethane of the formula

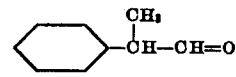

is obtainable.

*Example 5.*—A mixture of 750 parts of 2-keto-6.10-dimethylundecane of the formula

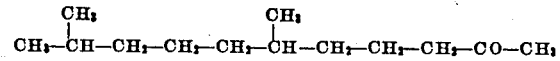

(hexahydropseudoionone) and 500 parts of chloroacetic acid ethyl ester is added drop by drop to 100 parts of finely subdivided sodium covered by 1500 parts of xylene. By working up the reaction mixture according to Example 1, 740 parts of the corresponding glycinic acid ester of the formula

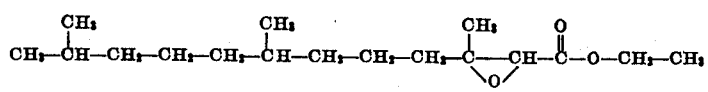

are obtainable boiling under a pressure of 4 to 5 mm. mercury at 160 to 165° C. By saponification and by splitting off carbondioxide, the 1-aldo-2.6.10-trimethylundecane of the formula

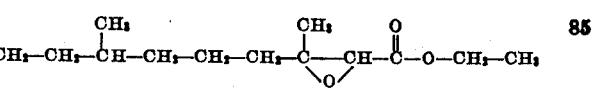

is obtainable, forming a colorless liquid, boiling under a pressure of 3 mm. mercury at 106 to 110° C. and having a fine flower-like odor.

*Example 6.*—In the course of 2 hours and at a temperature of 8° C. a mixture of 620 parts of decahydro-2-ketonaphthalene of the formula

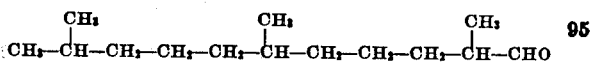

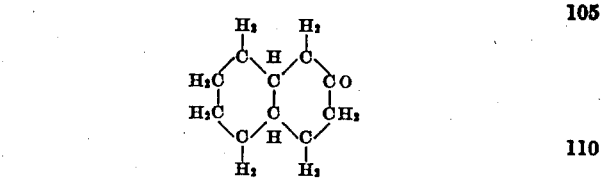

and of 520 parts of chloroacetic acid ethyl ester is slowly added to 100 parts of finely subdivided metallic sodium covered by 1500 parts of xylene. When working up the reaction mass according to Example 1, 780 parts of the corresponding glycinic acid ester of the formula

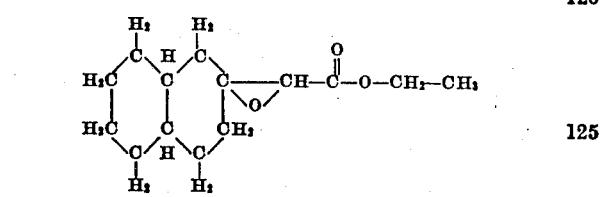

are obtainable, boiling under a pressure of 5 mm. mercury at 152 to 157° C. from which by the cleavage described the decahydro-2-naphthaldehyde of the formula

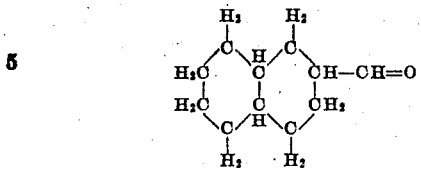

is obtained forming a colorless liquid which boils under a pressure of 4 mm. mercury at 100 to 102° C. and which has an intensive amber-like odor.

*Example 7.*—A mixture of 750 parts of 1.1.3-trimethyl-2-(2³-ketobutyl)-cyclohexane of the formula

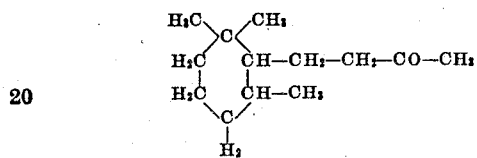

and of 550 parts of chloroacetic acid ethyl ester is added drop by drop to 100 parts of sodium covered by 1500 parts of xylene. From the reaction mixture 785 parts of the corresponding glycinic acid ester boiling under a pressure of 4 to 5 mm. mercury at 170 to 175° C. and from this ester the 1.1.3-trimethyl-2-(2⁴-aldo-2³-methobutyl)-cyclohexane of the formula

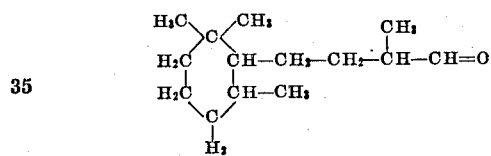

are obtainable forming a colorless liquid, boiling under a pressure of 3 mm. mercury at 115 to 120° C. and having an agreeable nut-like odor.

Our invention is not limited to the foregoing examples or to the specific details given therein. Thus, the chloroacetic acid ethyl ester used in the examples may be replaced by a bromoacetic acid alkyl ester. Instead of the xylene there may be used one of the other indifferent liquids enumerated above. Finally, another alkaline condensing agent may be applied.

As seen from the numerous examples, our new modification of the condensing process facilitates the manufacture of a great number of valuable aldehydes and makes possible the preparation of many substituted aldehydes which hitherto were unknown. However, the number of compounds is not exhausted by the aldehydes mentioned in these examples, and in a completely analogous manner, for instance, naphthaldehyde, furfurol, other substituted benzaldehydes, other cyclic ketones or aliphatic ketones with short or long, branched or unbranched carbon chains may be subjected to the reaction.

In the table following hereafter, we enumerate a selection of such products we prepared according to the process described in the foregoing paragraphs:—

We obtained
from benzaldehyde:
  phenyl glycinic acid ethyl ester, a colorless liquid, having an apple-like odor. B. p. $_{4-5\ mm.}$=128–130° C.
  phenylacetaldehyde, a colorless liquid, having a hyacinth odor. B. p. $_{10\ mm.}$=80–82° C.
from 4-methylbenzaldehyde:
  4-methylphenylglycinic acid ethyl ester, a colorless liquid, having a raspberry odor. B. p. $_{3-4\ mm.}$=145–147° C.
  4-methylphenylacetaldehyde, a colorless liquid, having a lilac odor. B. p. $_{3\ mm.}$=80–82° C.
from 4-ethylbenzaldehyde:
  4-ethylphenyl glycinic acid ethyl ester, a colorless liquid, having a raspberry odor. B. p. $_{3\ mm.}$=155–160° C.
  4-ethylphenylacetaldehyde, a colorless liquid, having a lilac odor. B. p. $_{3-4\ mm.}$=98–100° C.
from 2.4-dimethylbenzaldehyde:
  2.4-dimethylphenyl glycinic acid ethyl ester, a colorless liquid, having a raspberry odor. B. p. $_{3\ mm.}$=150–155° C.
  2.4-dimethylphenylacetaldehyde, a colorless liquid, having a lilac odor. B. p. $_{2-3\ mm.}$=95–98° C.
from 4-isopropylbenzaldehyde:
  4-isopropylphenyl glycinic acid ethyl ester, a colorless, slightly smelling liquid. B. p. $_{4-5\ mm.}$=165–170° C.
  4-isopropylphenylacetaldehyde, a colorless liquid, smelling like mimosa. B. p. $_{5\ mm.}$=105° C.
from 4-(1'-methopropyl)-benzaldehyde:
  4-(1'methopropyl)-phenyl glycinic acid ethyl ester, a colorless, slightly smelling liquid. B. p. $_{5\ mm.}$=170–175° C.
  4-(1'-methopropyl)-phenylacetaldehyde, a colorless liquid, smelling like mimosa. B. p. $_{2-3\ mm.}$=105° C.
from 2.4-diisopropylbenzaldehyde:
  2.4-diisopropylphenyl glycinic acid ethyl ester, a colorless liquid, smelling like amber. B. p. $_{3-4\ mm.}$=175–185° C.
  2.4-diisopropylphenyl acetaldehyde, a colorless liquid, having the odor of musk grains. B. p. $_{5-6\ mm.}$=129–130° C.
from 4-methoxybenzaldehyde:
  4-methoxyphenyl glycinic acid ethyl ester, a colorless liquid, decomposed during distillation.
  4-methoxyphenylacetaldehyde, a colorless liquid, smelling like hay. B. p. $_{11-12\ mm.}$=120° C.
from 5.6.7.8-tetrahydro-1-naphthaldehyde:
  5.6.7.8-tetrahydro-1-naphthyl glycinic acid ethyl ester, a colorless liquid. B. p. $_{10\ mm.}$ = 185–190° C.

5.6.7.8-tetrahydro-1-naphthylacetaldehyde, a colorless liquid, smelling like amber. B. p. $_{5\ mm.}$ = 135–140° C.

from 2-keto-decane (methyloctylketone):

β-methyl-β-octyl-glycinic acid ethyl ester, a colorless liquid, having a slight odor of fruit ester. B. p. $_{4\ mm.}$ = 150–155° C.

1-aldo-2-methyl-decane (methyloctylacetaldehyde), a colorless liquid, having an intensive sweet odor of flowers. B. p. $_{3\ mm.}$ = 85–88° C.

from 2-keto-undecane (methylnonylketone):

β-methyl-β-nonyl-glycinic acid ethyl ester, a colorless liquid, smelling similar to fruit ester. B. p. $_{3-4\ mm.}$ = 155–160° C.

1-aldo-2-methyl-undecane (methylnonylacetaldehyde), a colorless liquid, smelling intensively like flowers. B. p. $_{3\ mm.}$ = 100–103° C.

from 2-keto-2-(para-isopropylphenyl) ethane (para-isopropylacetophenone):

β-methyl-β-(para-isopropylphenyl)-glycinic acid ethyl ester, a slightly smelling liquid. B. p. $_{13\ mm.}$ = 170–175° C.

1-aldo-2-methyl-2-(para-isopropylphenyl)-ethane, a colorless liquid, smelling like mimosa. B. p. $_{13\ mm.}$ = 115–120° C.

from 2-keto-2-para-methoxyphenylethane (methyl-para-methoxyphenylketone):

β-methyl-β-(para-methoxyphenyl)-glycinic acid ethyl ester, a yellowish liquid, having the odor of anise. B. p. $_{10\ mm.}$ = 165–169° C.

1-aldo-2-methyl-2-(para-methoxyphenyl)-ethane, a colorless liquid, having the odor of anise and hay. B. p. $_{11\ mm.}$ = 125° C.

from 2-keto-4-phenylbutane:

β-methyl-β-(phenylethyl)-glycinic acid ethyl ester, a colorless, only slightly smelling liquid. B. p. $_{9\ mm.}$ = 160–165° C.

1-aldo-2-methyl-4-phenylbutane, a colorless liquid, having a flower-like odor. B. p. $_{10\ mm.}$ = 105–107° C.

from 2-keto-4-para-isopropylphenyl butane:

β-methyl-β-(para-isopropylphenyl)-glycinic acid ethyl ester, a colorless, only slightly smelling liquid. B. p. $_{3\ mm.}$ = 175–180° C.

1-aldo-2-methyl-4-(para-isopropylphenyl)-butane, a colorless liquid, having a flowerlike, aromatic odor. B. p. $_{5-6\ mm.}$ = 135–140° C.

from 1.1.3-trimethyl-1-2-($2^3$-ketopentyl)-cyclohexane; glycinic acid ester $$\begin{array}{c} CH_3\diagdown \diagup CH_3 \\ C \\ H_2C \diagup \diagdown CH-CH_2-CH_2-C \diagup \diagdown CH-C-O-CH_2-CH_3 \\ | \quad\quad\quad\quad | \quad\quad\quad CH_2-CH_2\ \ O \\ H_2C \quad CH-CH_3 \quad\quad\quad \diagdown O \diagup \\ \diagdown C \diagup \\ | \\ H_2 \end{array}$$

a colorless liquid. B. p. $_{5\ mm.}$ = 178–186° C.

1.1.3-trimethyl-2-($2^4$-aldo-$2^3$-ethobutyl)-cyclohexane, a colorless liquid, smelling similar to nuts and leaves. B. p. $_{3-4\ mm.}$ = 125–130° C.

What we claim is:—

1. The process which comprises condensing a halogeno acetic acid alkyl ester with a compound containing the atomic configuration >C=O of the group consisting of aromatic aldehydes, aliphatic ketones, aliphatic-aromatic ketones and cyclic ketones with an alkaline condensing agent in the presence of an indifferent liquid medium of the group consisting of aliphatic hydrocarbons, liquid at normal temperature, aromatic hydrocarbons of the benzene series, hydroaromatic hydrocarbons and chlorinated aromatic hydrocarbons of the benzene series, and cleaving the substituted glycinic acid ester formed.

2. The process which comprises condensing a halogeno acetic acid alkyl ester with a compound containing the atomic configuration >C=O of the group consisting of aromatic aldehydes, aliphatic ketones, aliphatic-aromatic ketones and cyclic ketones with an alkaline condensing agent in the presence of an indifferent liquid medium of the group consisting of aliphatic hydrocarbons, liquid at normal temperature, aromatic hydrocarbons of the benzene series, hydroaromatic hydrocarbons and chlorinated aromatic hydrocarbons of the benzene series, removing the said indifferent liquid medium, saponifying the substituted glycinic acid ester formed, acidifying the solution obtained and subjecting simultaneously the reaction mass to distillation with steam.

3. The process which comprises condensing chloroacetic acid ethyl ester with a compound containing the atomic configuration >C=O of the group consisting of aromatic aldehydes, aliphatic ketones, aliphatic-aromatic ketones and cyclic ketones with pulverized metallic sodium in the presence of an indifferent liquid medium of the group consisting of aliphatic hydrocarbons liquid at normal temperature, aromatic hydrocarbons of the benzene series, hydroaromatic hydrocarbons and chlorinated aromatic hydrocarbons of the benzene series, and cleaving the substituted glycinic acid ester formed.

4. The process which comprises condensing chloroacetic acid ethyl ester with a compound containing the atomic configuration >C=O of the group consisting of aromatic aldehydes, aliphatic ketones, aliphatic-aromatic ketones and cyclic ketones with pulverized metallic sodium in the presence of an indifferent liquid medium of the group consisting of aliphatic hydrocarbons, liquid at normal temperature, aromatic hydrocarbons of the benzene series, hydroaromatic hydrocarbons and chlorinated aromatic hydrocarbons of the benzene series, removing the said indifferent liquid medium, saponifying the substituted glycinic acid ester formed, acidifying the solution obtained and subjecting simultaneously the reaction mass to distillation with steam.

5. The process which comprises adding while stirring and cooling a mixture of a chloroacetic acid alkyl ester and of a compound containing the atomic configuration >C=O of the group consisting of aromatic aldehydes, cyclic ketones, aromatic and aliphatic ketones to pulverized metallic sodium covered by an indifferent liquid of the group consisting of aliphatic hydrocarbons liquid at normal temperature, aromatic hydrocarbons of the benzene series, hydroaromatic hydrocarbons and chlorinated hydrocarbons of the benzene series, saponifying the substituted glycinic acid formed, acidifying the solution obtained and subjecting simultaneously the reaction mass to distillation with steam.

6. The process which comprises adding while stirring and cooling a mixture of 750 parts of 2-keto-6.10-dimethylundecane and 500 parts of chloroacetic acid ethyl ester upon 100 parts of pulverized sodium covered by 1500 parts of xylene, saponifying the substituted glycinic acid formed, acidifying the solution and subjecting simultaneously the reaction mass to distillation with steam.

7. The process which comprises adding while stirring and cooling a mixture of 620 parts of decahydro-2-ketonaphthalene and 520 parts of chloroacetic acid ethyl ester upon 100 parts of pulverized sodium covered by 1500 parts of xylene, saponifying the substituted glycinic acid formed, acidifying the solution and subjecting simultaneously the reaction mass to distillation with steam.

8. The process which comprises adding while stirring and cooling a mixture of 750 parts of 1.1.3-trimethyl-2-(2³-ketobutyl)-cyclohexane and 550 parts of chloroacetic acid ethyl ester upon 100 parts of pulverized sodium covered by 1500 parts of xylene, saponifying the substituted glycinic acid formed, acidifying the solution and subjecting simultaneously the reaction mass to distillation with steam.

9. As new articles of manufacture the aldehydes of the general formula

R meaning 2.6.10-trimethyl decyl, decahydronaphthyl, 1-(1.1.3-trimethyl cyclohexyl)-3-methopropyl, these aldehydes having an intensive fragrant odor.

10. As a new article of manufacture the 1-aldo-2.6.10-trimethylundecane of the formula:

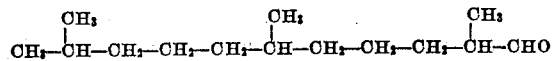

being a colorless liquid boiling under a pressure of 3 mm. mercury at 106 to 110° C. and having a fine flower-like odor.

11. As a new article of manufacture the decahydro-2-naphthaldehyde of the formula

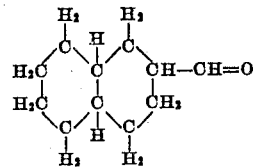

being a colorless liquid boiling under a pressure of 4 mm. mercury at 100 to 102° C. and smelling intensively like amber.

12. As a new article of manufacture the 1.1.3-trimethyl-2-(2⁴-aldo-2³-methobutyl)-cyclohexane of the formula

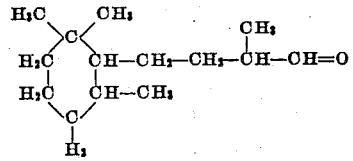

being a colorless liquid boiling under a pressure of 3 mm. mercury at 115 to 120° C. and having an agreeable odor similar to nuts and leaves.

In testimony whereof, we affix our signatures.

ANGELO KNORR.
ALBERT WEISSENBORN.
EMIL LAAGE.

DISCLAIMER 1,899,340.—*Angelo Knorr*, Berlin-Tempelhof, *Albert Weissenborn*, Potsdam, and *Emil Laage*, Uerdingen, Germany. PROCESS OF MANUFACTURING ALDEHYDES AND THE PRODUCTS. Patent dated Feb. 28, 1933. Disclaimer filed May 5, 1945, by the assignee, *Winthrop Chemical Company, Inc.*

Hereby enters this disclaimer to claims 8 and 12 and the following portion of claim 9—

"1-(1.1.3-trimethyl cyclohexyl)-3-methopropyl,"

[*Official Gazette June 12, 1945.*]